(12) United States Patent
Little et al.

(10) Patent No.: US 11,092,476 B2
(45) Date of Patent: Aug. 17, 2021

(54) SCALE AND MONITORING SYSTEM FOR RUBBER RECYCLING PROCESSES AND OTHER USES WHICH MAY BE USED TO OPTIMIZE COLLECTION, FREIGHT AND DOWNSTREAM RECYCLING PROCESSES

(71) Applicant: Sparton Enterprises, Inc., Norton, OH (US)

(72) Inventors: Dave Little, Brecksville, OH (US); Andy Little, Wadsworth, OH (US); Allen Rider, Norton, OH (US)

(73) Assignee: Spartan Enterrises, Inc., Norton, OH (US)

( * ) Notice: Subject to any disclaimer, the term of this patent is extended or adjusted under 35 U.S.C. 154(b) by 212 days.

(21) Appl. No.: 16/224,131

(22) Filed: Dec. 18, 2018

(65) Prior Publication Data
US 2019/0204137 A1   Jul. 4, 2019

Related U.S. Application Data

(60) Provisional application No. 62/611,435, filed on Dec. 28, 2017.

(51) Int. Cl.
| | | |
|---|---|---|
| *G01G 3/14* | (2006.01) | |
| *G01G 19/12* | (2006.01) | |
| *G01G 19/02* | (2006.01) | |
| *G01G 23/36* | (2006.01) | |
| *G01G 23/42* | (2006.01) | |

(52) U.S. Cl.
CPC .............. *G01G 3/14* (2013.01); *G01G 19/021* (2013.01); *G01G 19/12* (2013.01); *G01G 23/36* (2013.01); *G01G 23/42* (2013.01)

(58) Field of Classification Search
CPC ........ G01G 3/14; G01G 19/021; G01G 19/12; G01G 23/36; G01G 23/42
See application file for complete search history.

(56) References Cited

U.S. PATENT DOCUMENTS

| | | | |
|---|---|---|---|
| 3,291,234 A | | 12/1966 | Woodburn |
| 4,691,792 A | * | 9/1987 | Shintani ................. G01G 5/045 177/1 |
| 4,850,552 A | | 7/1989 | Darden et al. |
| 4,854,409 A | | 8/1989 | Hillebrand et al. |

(Continued)

OTHER PUBLICATIONS

Intercomp, AX900 Filling Scale System, Web, Dec. 4, 2017.

*Primary Examiner* — Randy W Gibson
(74) *Attorney, Agent, or Firm* — Emerson, Thomson & Bennett, LLC; Roger D. Emerson

(57) ABSTRACT

Provided is a scaling and monitoring system for remotely weighing, monitoring, and measuring volumes of rubber buffings (also referred to in text as "shavings" or "dust") produced by commercial tire retreading plants and other materials. The method utilizes a custom scale system installed underneath a shipping container or a semi van trailer, container, or other collection and storage unit or area. The custom scale system feeds weight data to a PLC and VPN/gateway-based control panel which processes and relays information to the Internet, thus allowing all accessible and recorded data to be remotely collected and viewed for the purpose of optimizing rubber dust collection and processing and minimizing overhead costs associated with such processes.

10 Claims, 16 Drawing Sheets

(56) References Cited

U.S. PATENT DOCUMENTS

| | | | | |
|---|---|---|---|---|
| 5,161,628 | A | * | 11/1992 | Wirth ................... G01G 19/08 177/137 |
| 5,167,289 | A | * | 12/1992 | Stevenson ............... G01G 5/04 177/141 |
| RE35,301 | E | * | 7/1996 | Reichow .............. G01G 3/1402 177/136 |
| 5,764,522 | A | * | 6/1998 | Shalev .................... A01K 5/02 177/116 |
| 7,009,118 | B2 | * | 3/2006 | Pottebaum ............. G01G 19/12 177/136 |
| 10,335,799 | B2 | * | 7/2019 | Chan .................. B29B 17/0404 |
| 2017/0314986 | A1 | | 11/2017 | Dyal |

* cited by examiner

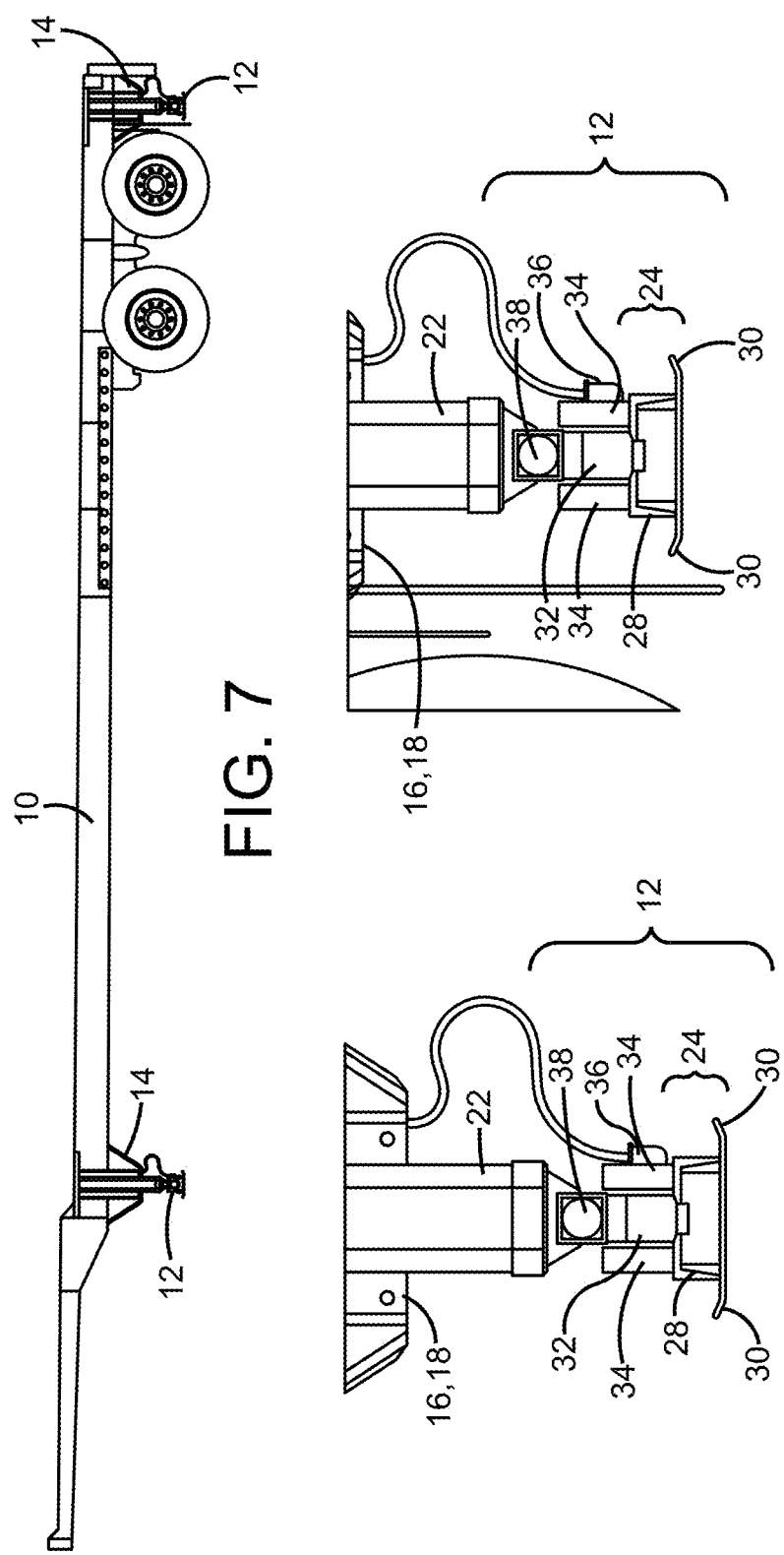

SCALE AND MONITORING SYSTEM FOR RUBBER RECYCLING PROCESSES AND OTHER USES WHICH MAY BE USED TO OPTIMIZE COLLECTION, FREIGHT AND DOWNSTREAM RECYCLING PROCESSES

CROSS REFERENCE TO RELATED APPLICATIONS

This non-provisional application claims priority to U.S. Provisional Patent Application Ser. No. 62/611,435, filed on Dec. 28, 2017.

TECHNICAL FIELD

The present disclosure relates to commercial scaling (weighing) applications and remote-monitoring systems (similar to SCADA systems also known as supervisory control and data acquisition systems). More specifically, the present disclosure relates to an apparatus and method that allows for efficient downstream management and processing of raw rubber dust material that is collected and monitored in a recycling process. However, it should be understood that the apparatus and method disclosed herein may be used for scaling any type of material that is collected for any number of reasons.

BACKGROUND

Weighing systems are commonplace in many commercial applications. These weighing systems can consist of a vast array of equipment designs, but most are based on various types of relatively rudimentary bridge circuit strain-gauge load cells. Weighing systems utilize these load cells along with an electronic device that provides an excitation current to create a signal change when an applied load changes. The signal change is then read and translated into a digital value by the electronic device.

Remote-monitoring systems, such as SCADA (Supervisory Control and Data Acquisition) systems are also well-known and utilized in many industries and operations, including oil and gas, facilities management, and power generation and transport. These systems generally collect analog or digital data from various devices, sensors, and processes and transmit the information to remote locations for analysis or manipulation.

The rubber dust collection and recycling process is a very large market related directly to commercial tire production and recycling, consisting of hundreds of millions of pounds of rubber shavings and dust production annually. The method of collection of these shavings is relatively straightforward and varies little between different vendors and recyclers. The process typically involves one or more centrifugal fans that provide a vacuum to tire-retreading (buffing) machines to pick up and transport rubber shavings to a containment vessel. The containment vessel is usually a hopper, a dry van semi-trailer, or a shipping container. The vessel is usually vented in some way to relieve excessive air pressure generated by the centrifugal fan.

Currently, there are no prior-existing physical or instrument associated methods for monitoring the production volume and rate of rubber dust production. Most tire producers as well as the recyclers or vendors collecting rubber dust utilize formulas based upon an average of shavings produced per one tire to determine the volume and weight of the rubber dust that is collected. Calculations are then performed on a regular basis using daily, weekly, or monthly tire production values. Unfortunately, there are an extraordinary amount of variables that are not taken into consideration in these calculations. One variable is "green" tire retreading, which results in substantially more rubber shavings than what is obtained from an "average" tire. A second variable is that some tires that are buffed (remaining tread is removed) are not added to the appropriate process count because the tire does not pass inspection and finish the process for any quality control reason. A third variable is that it is commonplace to run like-treaded tires in large batches compared to running many different types of treaded tires at once. This significantly sways any average value given to dust production per tire. A fourth variable is that production shifts are often run outside of common days or shifts and are not reported and factored into the calculation. A fifth variable is that maintenance or down time of equipment is also not reported and factored into the calculation. The above-mentioned variables is not an exhaustive list and represent only some of the variables that are often omitted from the calculations.

Aside from the inherent inaccuracy of scaling calculations related to the aforementioned variables, there are also very straightforward problems relative to recordkeeping, production tracking and reporting, and communication obstacles. Rubber dust collection relative to the actual commercial tire production is very much a background process. The commercial tire production industry cannot function without the rubber dust collection industry. The rubber dust collection industry, however, has very little limelight in the scope of the business of tire manufacturers. As such, the processes associated with the rubber dust collection industry are generally not given appropriate attention. In order for the aforementioned production calculations to have any opportunity to be utilized, a recycler or vendor must, at a bare minimum, have a tire production count from the tire manufacturer. This number can be extraordinarily difficult or impossible to retrieve from the appropriate person, especially when many recyclers or vendors try to request it on a daily or weekly basis. Frequently, associated personnel will not take the time to report the necessary values, or may report inaccurate values depending on the particular step in the manufacturing process the number is generated or retrieved from.

Due to these many obstacles and unknown variables, the collection of rubber dust for further recycling, processing, and resale is currently an extraordinarily inefficient operation. Most recyclers or vendors collect the buffings in a geographic region that makes sense to their business model. However, some regions can be as large as an entire nation, with some international dealings commonplace as well. As such, rubber dust must be transported by tractor-trailer over the road and occasionally by rail. Most, if not all, roadways (with the focus within the United States) have maximum weight limits for commercial vehicle travel. This, in turn, limits the net weight of rubber dust (or any raw good, commodity, or product) that can be safely and legally transported. A full, legal truckload of rubber dust material can take from a few days to six months or more to produce. However, because the current methodology is basically a "best guess" approach, these loads are often dispatched and picked up at inopportune and inefficient times. If the load is well below the maximum net weight allowed on the road, the freight cost to haul the dust to its final processing location increases, many times dramatically depending on the location and distance of travel. Moreover, the opposite occurrence of an overloaded vessel can be much costlier and time consuming than an underload. In that event, the load cannot be safely or legally transported to its destination without first being partially unloaded to meet Department of Transportation weight requirements or limits.

In addition to the preceding freight expenses incurred because of the inaccuracy of dust production reporting and monitoring, downstream recycling processes which rely substantially upon the volumes of rubber dust generated relative to a mixture of commercial tire manufacturers are also negatively impacted. The downstream recycling of rubber buffing dust creates products that are used in the likes of running tracks, loose and pour-in-place playgrounds, rubber flooring and tiles, landscaping, and many other markets and products. The efficient processing of this rubber buffing dust is dependent upon having a "blend," or mixture, of various particle sizes of shavings and dust. Each commercial tire buffing machine has a signature shaving method and pattern that generates varying particle sizes which can range from 30 mesh minus dust to shavings or peelings many inches long. Each machine has a high repeatability. However, because there are a significant variety of machines in the industry, the consistency of the buffing dust generated varies markedly between commercial tire producers. The consistency can even vary between plants underneath a single umbrella due to knife styles, equipment age, and many other factors.

Downstream recycling processes mainly consist of various stages of screening and particle separation, granulation or other size-reduction, destoning, and cleaning. The aforementioned products developed from the rubber buffing dust are common from recycler to recycler, and as such, the processing is much the same. Given that the processes and products are much alike across the industry, all recyclers or vendors involved in rubber dust collection are similarly reliant upon having an appropriate blend of particle sizes and volumes (determined by current market and customer-based demand). Without appropriate ratios, which oftentimes require accuracies of single percentage points, the recycling process loses efficiency across all overhead costs or cannot function at all since final recycling output is dependent upon production values.

Referring back to rubber dust transport and freight, the fact that actual volumes are unknown until the vessel is removed from the dust collection system, scaled, and a net weight of its buffing content is determined is extraordinarily inexpedient. The downstream recycling of this rubber is much like any other production process, requiring satisfactory scheduling and planning to operate efficiently. When there is a high market demand for products derived from rubber buffings, the recyclers and vendors generally cannot stockpile a variety of particle sizes as required for processing. It is fairly easy to track and keep record of the consistencies produced by various suppliers (commercial tire manufacturers). However, when rubber shortages are present and no stockpile exists for selection reasons, recyclers or vendors rely on seeking out volumes that are currently in production. When this situation occurs, which is commonplace in peak seasons and high-demand years, the recycler has little choice but to retrieve loads without optimal weights. From an operations standpoint, this is costly and unfavorable, but a necessity to continue business. Unfortunately, while consistencies are often known, the weights (or volumes) are simply not. When in a tight production market, not having enough of a particular consistency because a load was retrieved too early or simply less than expected due to other mentioned variables can lead to down time, quality control issues, and unnecessary costs.

Given the extraordinary inefficiency of current rubber dust collection, transport, and recycling processes, which are all directly interrelated, there exists a need for an apparatus and method of monitoring actual buffing production in order to rectify the common issues and optimize the collection and all subsequent downstream processes.

SUMMARY

An onboard weighing system for monitoring a materials collection system which comprises a storage area, a front landing gear, and a rear landing gear. The front landing gear comprises at least one receiving channel, at least one movable support capable of being removably inserted within the receiving channel, and at least one front landing gear scale affixed to the bottom of the movable support about a pivoting axis. The front landing gear scale further comprises a load cell with a sensor and a support pad positioned beneath the load cell. The rear landing gear comprises at least one receiving channel, at least one movable support capable of being removably inserted within the receiving channel, and at least one rear landing gear scale affixed to the bottom of the movable support about a pivoting axis. The rear landing gear scale further comprises a load cell with a sensor and a support pad positioned beneath the load cell. Each of the front and rear landing gear scales may be placed in the extended position such that the support pads are in direct contact with a target surface. The landing gear scales are further in continuous communication with a control unit so as to monitor the weight of processed material contained in the storage area.

A method of operating an onboard weighing system for monitoring a materials collection system which involves first placing a shipping container, having both front and rear landing gears, such that it may receive processed materials from a materials processing facility. Each of the front and rear landing gears have at least one receiving channel, at least one movable support capable of being removably inserted within the receiving channel, and at least one landing gear scale attached to the bottom of the movable support about a pivoting axis, where the landing gear scale has a load cell with a sensor and a support pad located beneath the load cell. Next, each of the front and rear landing gears are engaged by extending the movable supports about the respective receiving channels until the support pads reach a target surface. A control panel, connected to the load cells, is then activated. The load cells transmit analog signals to the control panel, which the control panel converts into digital weight values known as the process data. The process data is then monitored by the control panel to evaluate the vehicle load of the shipping container, whereupon the optimum time to transport the processed material based upon the process data may be selected.

BRIEF DESCRIPTION OF THE DRAWINGS

The accompanying drawings in the following description illustrate various embodiments of the present disclosure:

FIG. 7 is a side view of a scaling system installed on a trailer that is in a retracted position;

FIG. 8 is a side view of a front landing gear of a scaling system;

FIG. 9 is a side view of a rear landing gear of a scaling system;

DETAILED DESCRIPTION

Figure 1:
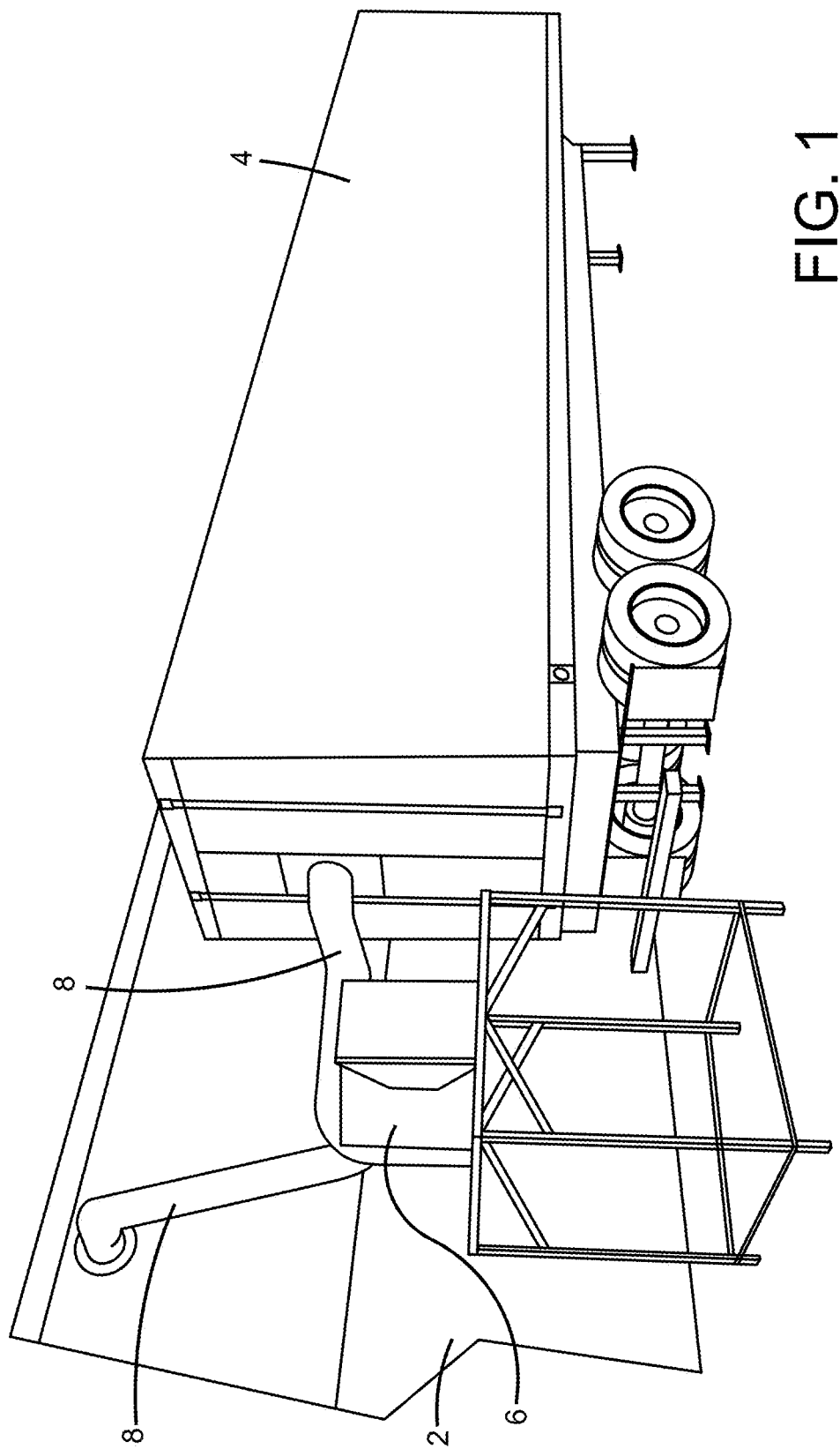
FIG. 1 is a perspective view of a scaling system installed on a trailer that is positioned adjacent to and connected to a commercial tire retreading plant.

The present disclosure is directed to an apparatus and a method of using a custom scaling and monitoring system and supporting electronic hardware to remotely weigh and monitor rubber dust production and collection at commercial tire producing plants. The apparatus and methods described herein increase operational efficiency in downstream recycling and reduce overhead costs and problems typically encountered and associated with the rubber dust collection process. However, although the scaling system disclosed herein is described with respect to the rubber recycling industry, it is understood the scaling system may be used with any type of material and within any industry that requires the scaling and monitoring of materials.

The rubber recycling process takes place primarily within a recycling plant such as a commercial tire retreading plant. Throughout the recycling process, a tremendous amount of rubber shavings and dust (referred to herein as "rubber buffings") are produced. As rubber buffings are created as a waste material, a system is employed to remove the rubber buffings from the recycling plant to a storage area and/or unit such as a shipping container on a semi-trailer, a container, or other collection, storage, or transport apparatus. This is typically accomplished through the use of one or more centrifugal fans positioned outside the recycling plant. The centrifugal fans create a vacuum which pulls the rubber buffings from the plant and blows them into a storage area/unit. An example of this is shown within FIGS. 1 and 2. As shown within FIGS. 1 and 2, a centrifugal fan (6) is positioned outside of a commercial tire retreading plant (2). The centrifugal fan (6) creates a vacuum within a plenum (8) that connects the fan to the interior of the plant. After receiving the rubber buffings from the plant (2), the fan (6) blows the rubber buffings into a shipping container (4) supported on a trailer.

As rubber buffings or other material are blown into the shipping container or storage area or unit, the custom scaling system weighs the amount of material produced and monitors the production volume and rate of material production. This is accomplished by installing the scaling system directly onto the shipping container or storage unit. The custom scaling system may therefore be referred to as an onboard weighing system. The scaling system is hard wired from the shipping container or storage unit to a custom control panel which allows information obtained from the scaling system to be electronically transmitted to a control panel. According to certain embodiments, each scale unit is hard wired to the custom control panel. The control panel operates to receive analog signals from the scale units and turns them into digital weight values. The information obtained by the control panel is processed to determine whether the shipping container contains an appropriate load and ensures the container is within the maximum regulatory weight allowed for commercial transportation and is not underloaded or overloaded. Once the container is full, the trailer may be reconnected to the tractor for shipment to the next recycling facility for further processing.

Figure 15:
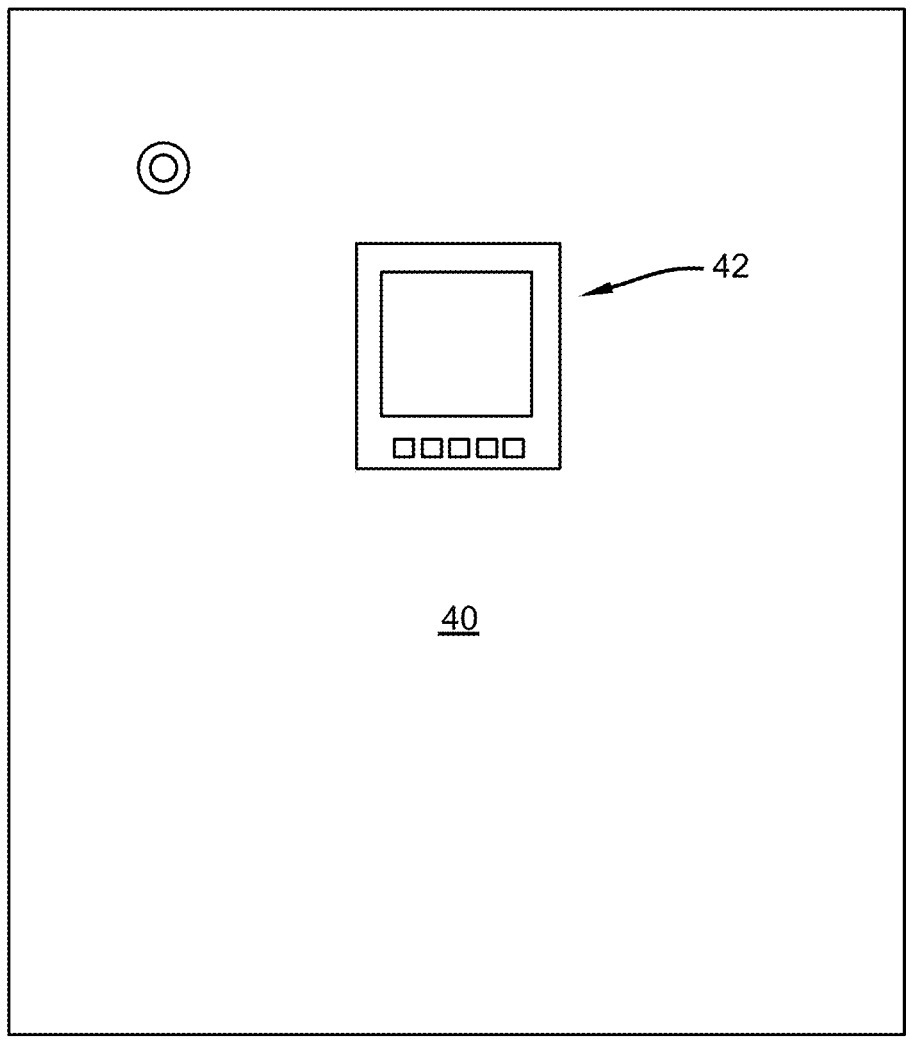
FIG. 15 illustrate an exemplary control panel used with a scaling system.
Figure 16:
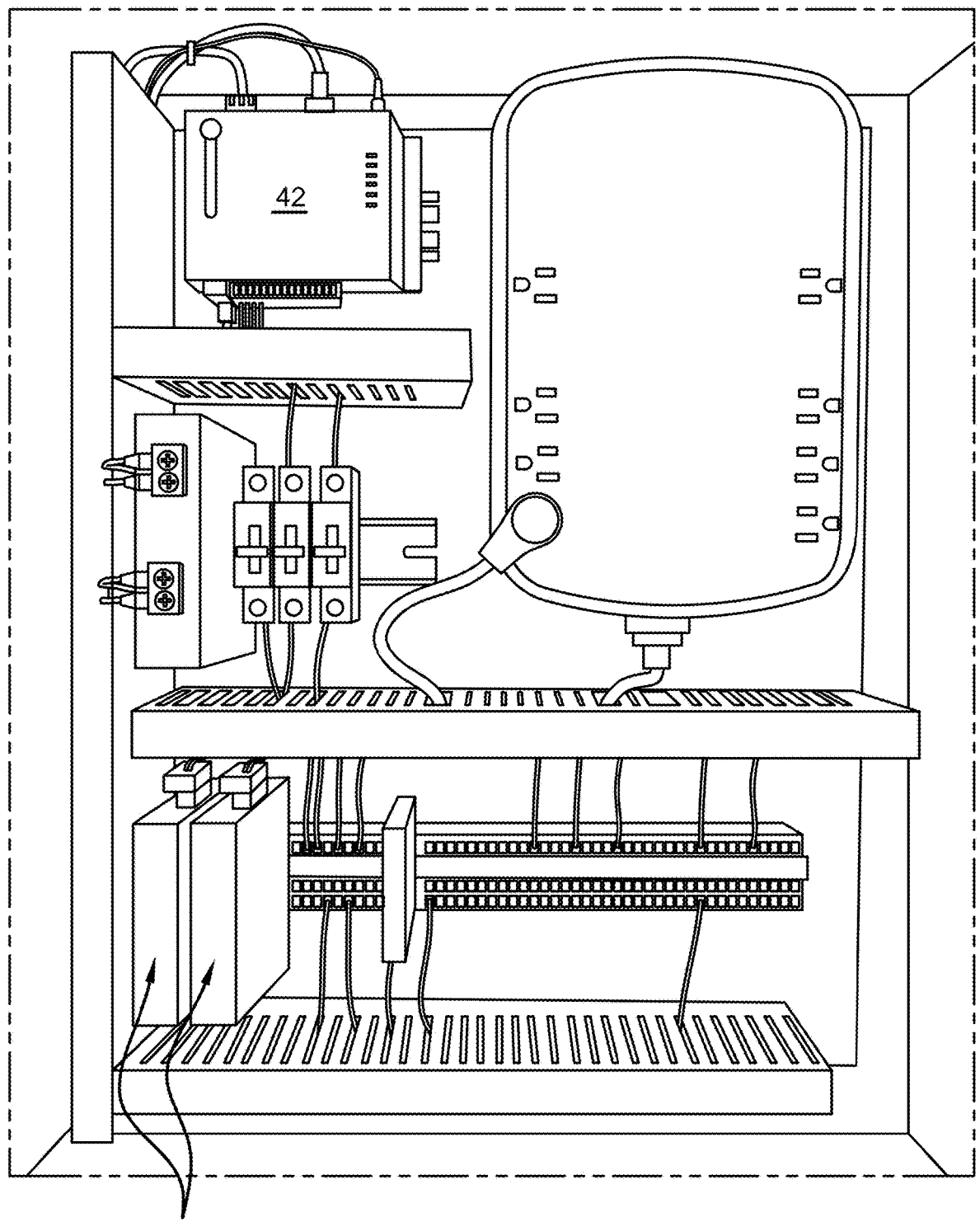
FIG. 16 illustrates a pair of signal conditioners which may be integrated into the control panel.
Figure 17:
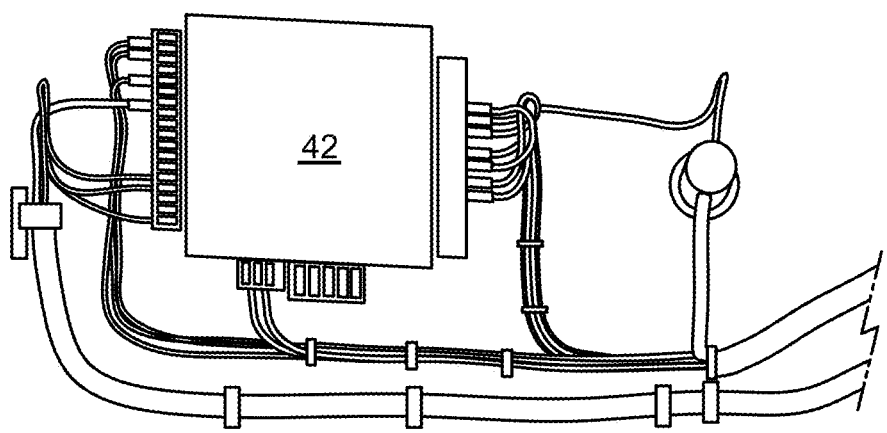
FIG. 17 is a controller which may be housed within the control panel.
Figure 18:
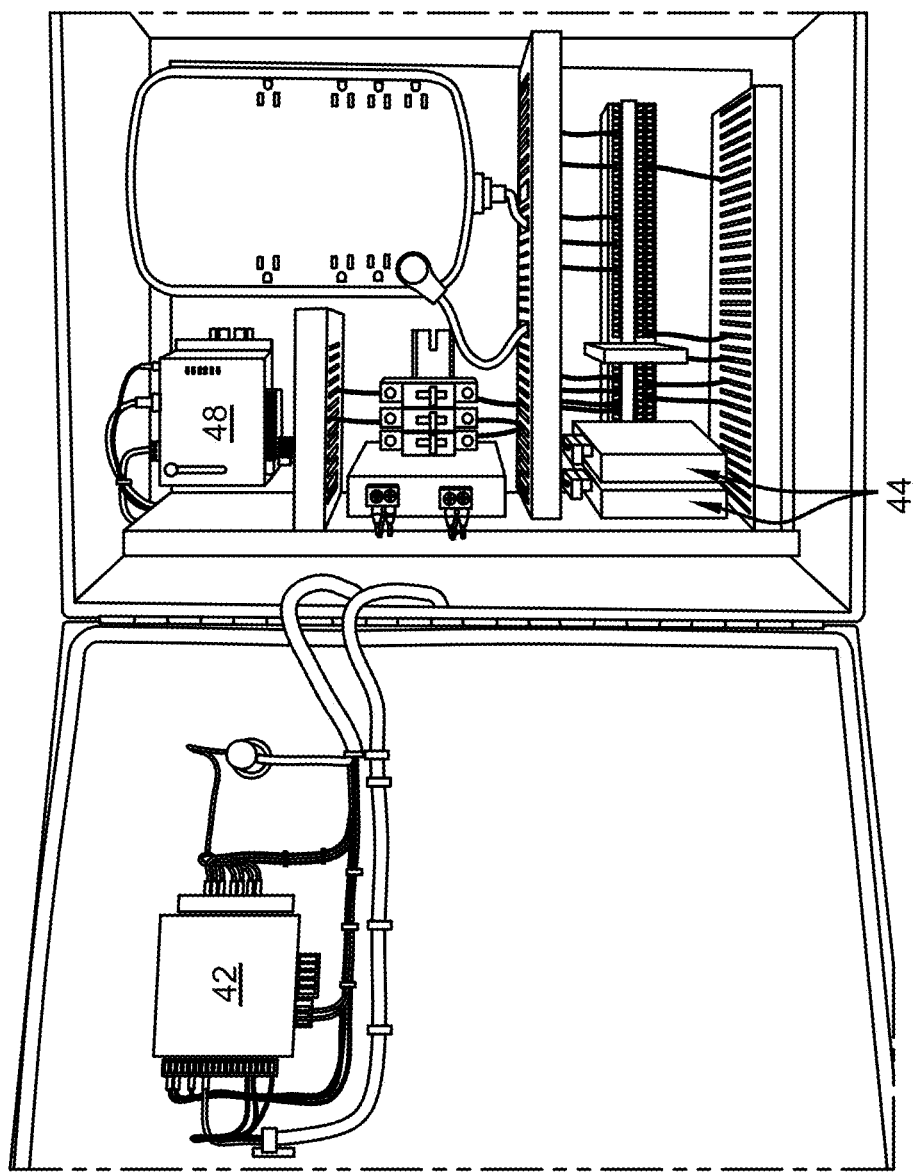
FIG. 18 shows the connective relationship between the controller and signal conditioners, housed within the control panel.

According to certain aspects of the present disclosure, the custom control panel (40) is installed inside the commercial tire production or retreading plant (4). An example of a custom control panel is illustrated within FIGS. 15-18. As seen in FIG. 15, the control panel (40) may include an integrated HMI/PLC (42) for on-site viewing and maintenance as well as for data manipulation. With reference now to FIG. 16, a pair of signal conditioners (44) on the scaling system provides the excitation signal for the load cells and separates signals received from the front and rear load cells on the shipping container or storage unit/area. Turning to FIGS. 17 and 18, after separating the signals, the conditioners (44) transmit the weight data to the PLC (42) via Modbus RTU (46) for datalogging, viewing, and summing. The PLC (42) transmits its values to a VPN/gateway (HMS Netbiter EC350) (48) via Modbus TCP (50), which has an established connection to the Internet via Ethernet or subscription cellular service.

In addition to calculating the weight values of the vessel, the control panel (40) is also connected directly to the centrifugal fans (6) of the material collection system via relays and electrical wiring. This allows the control panel to retrieve and monitor information related to the operation of the centrifugal fans such as run times and fan motor status. The control panel retrieves this information related to the operation of the centrifugal fans and converts it to digital values. These digital values are then transmitted to a webserver on the Internet, where the data can be remotely accessed, viewed, and further analyzed or manipulated. In certain embodiments, the custom scaling system feeds weight data to a PLC and VPN/gateway-based control panel (40) to relay information to the Internet, thus allowing all accessible and recorded data to be remotely collected and viewed for the purpose of optimizing rubber dust collection and processing and minimizing overhead costs associated with such processes.

According to certain aspects of the present disclosure, the custom scaling system includes landing gear scales installed underneath a mode for collection and transport. As mentioned above, according to certain aspects of the present disclosure, the mode for collection and transport is a chassis and shipping container. An example of this is shown within FIGS. 1-14. However, it is also contemplated that the mode for collection and transport may be a hopper, a dry van-trailer, or any type of vehicle within the sound judgment of a person of skill in the art.

Any number of landing gear scales may be used with the mode for collection and transport. According to certain aspects of the present disclosure, a chassis and container is provided with at least two landing gear scales. In further embodiments, the chassis and container is provided with at least four landing gear scales. According to certain aspects of the present disclosure, four landing gear scales may be considered to constitute a complete set of scale units. However, the chassis and container may contain any number of landing gear scales as deemed suitable by a person of skill in the art.

Figure 2:
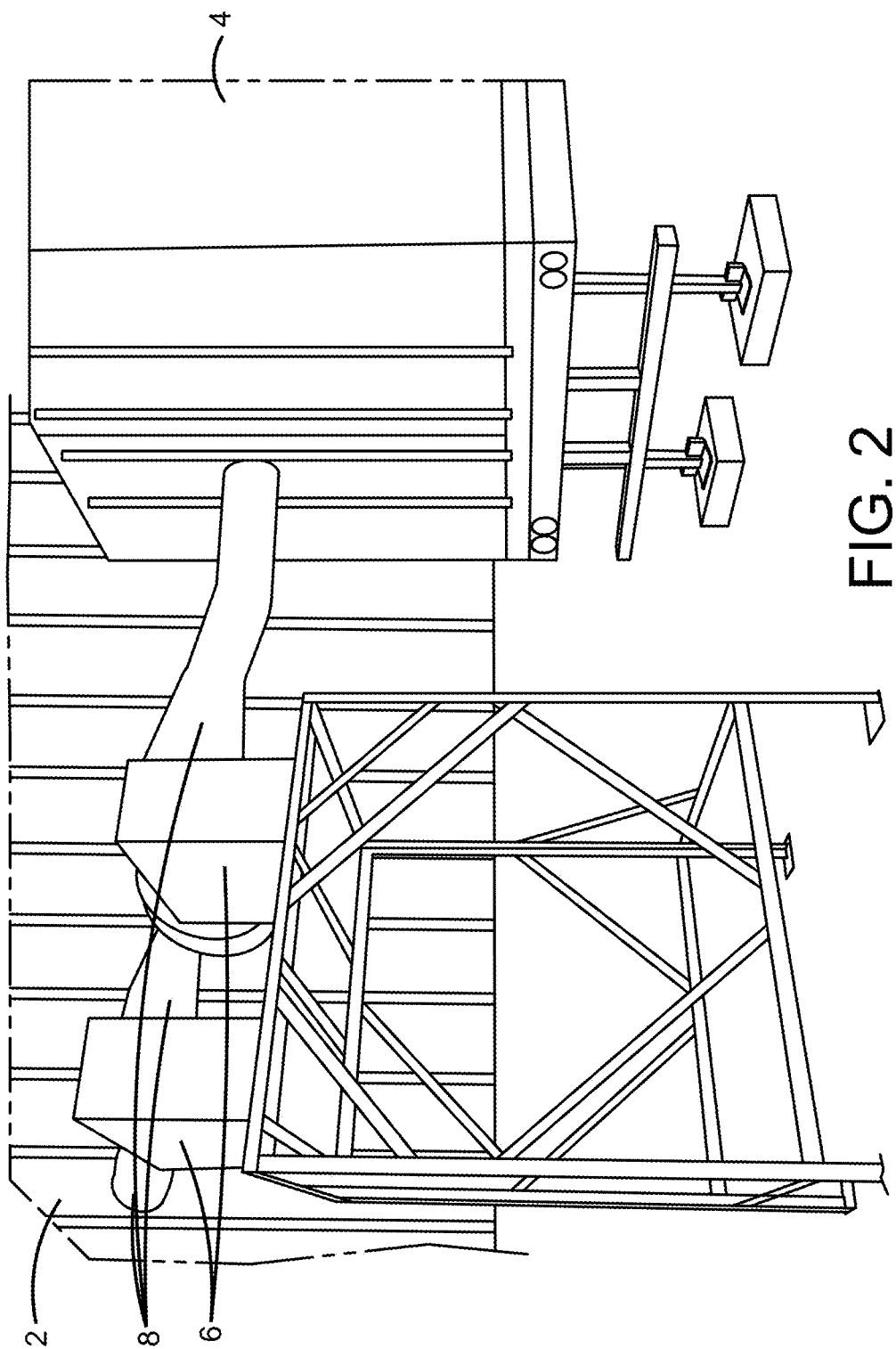
FIG. 2 is a perspective view of a scaling system installed on a trailer that is positioned adjacent to and connected to a commercial tire retreading plant.
Figure 3:
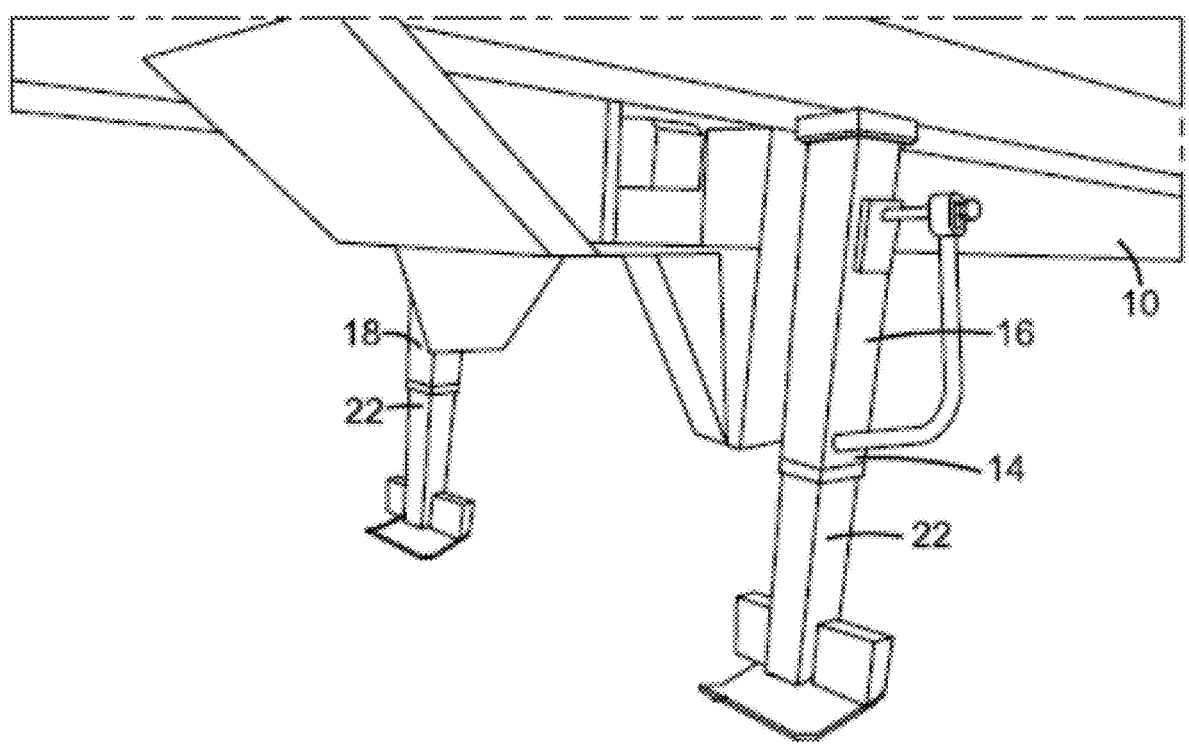
FIG. 3 is a perspective view of a scaling system installed on the front landing gear of a trailer.
Figure 4:
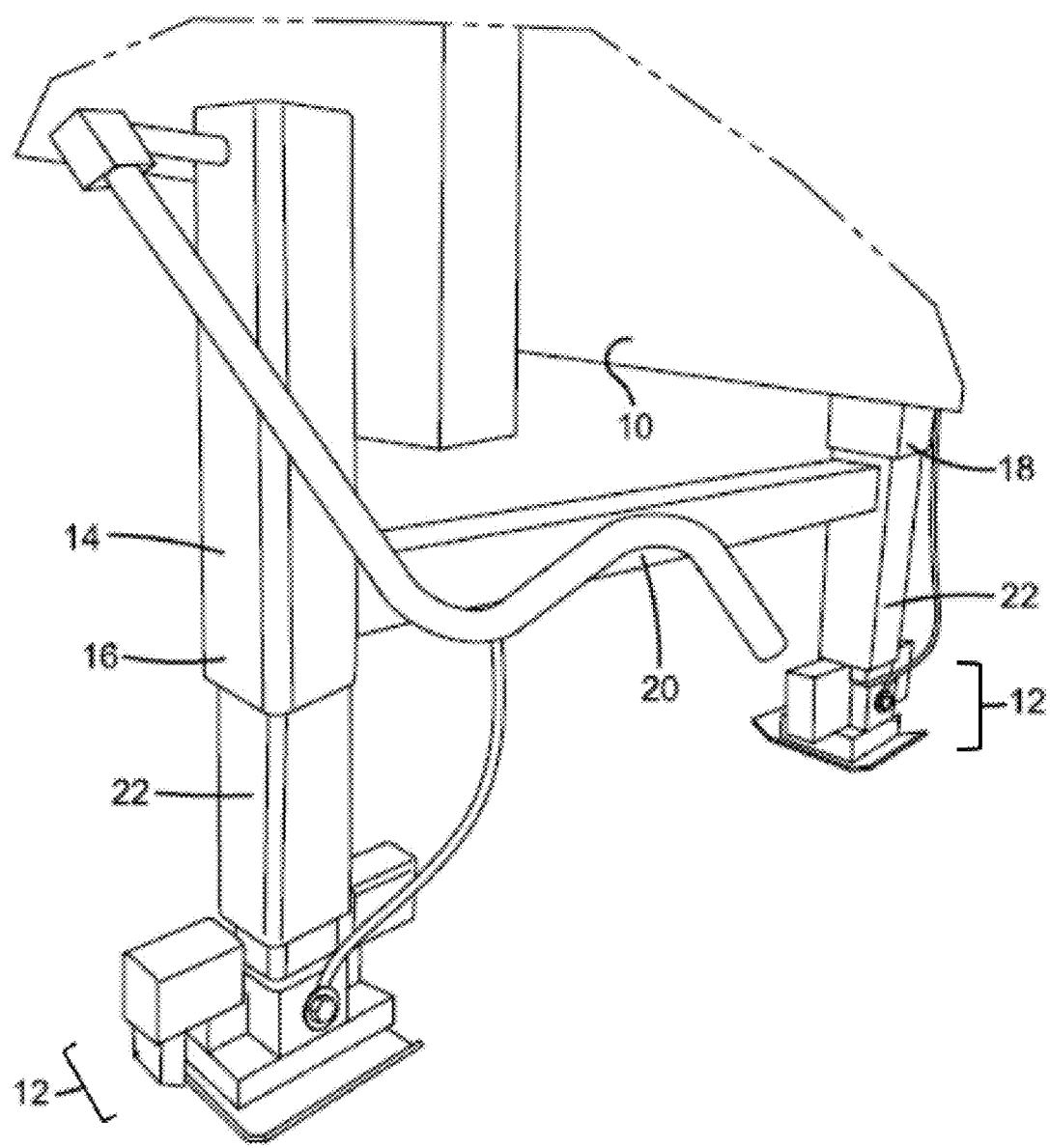
FIG. 4 is a perspective view of a scaling system installed on the front landing gear of a trailer.
Figure 5:
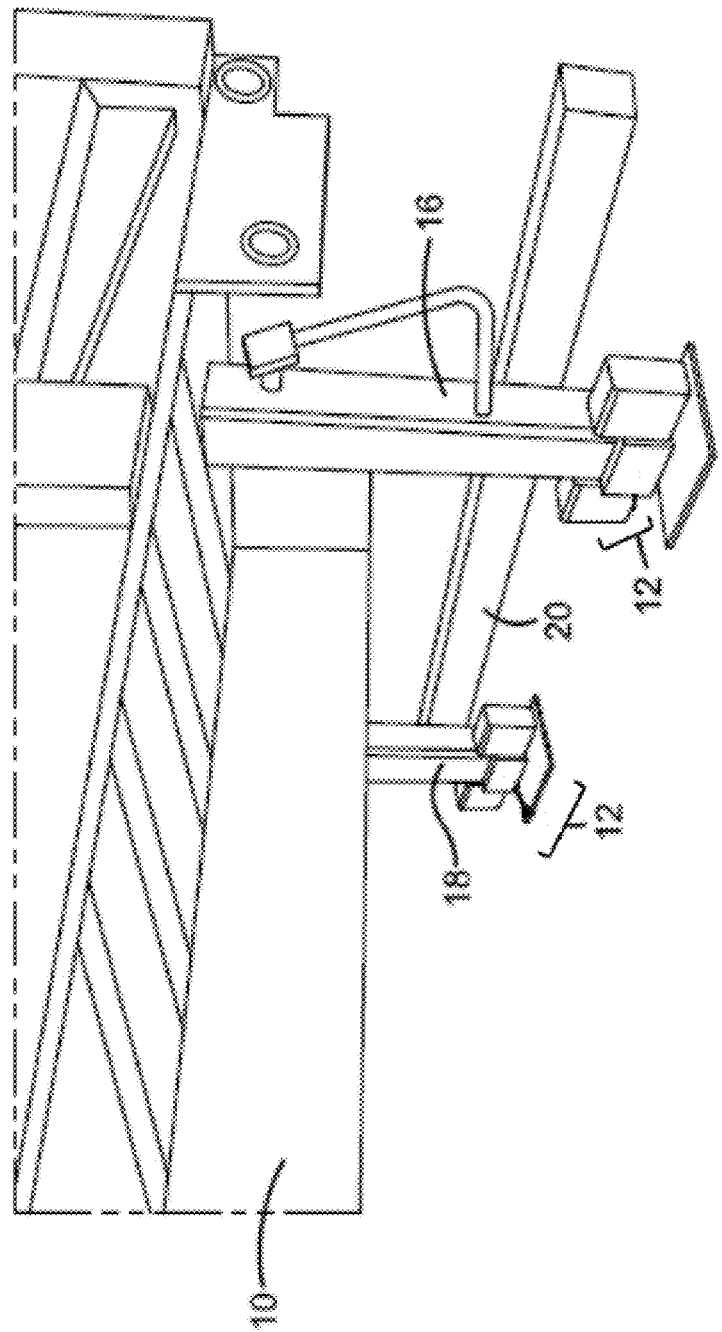
FIG. 5 is a perspective view of a rear landing gear of a scaling system installed on the back end of a trailer.
Figure 6:
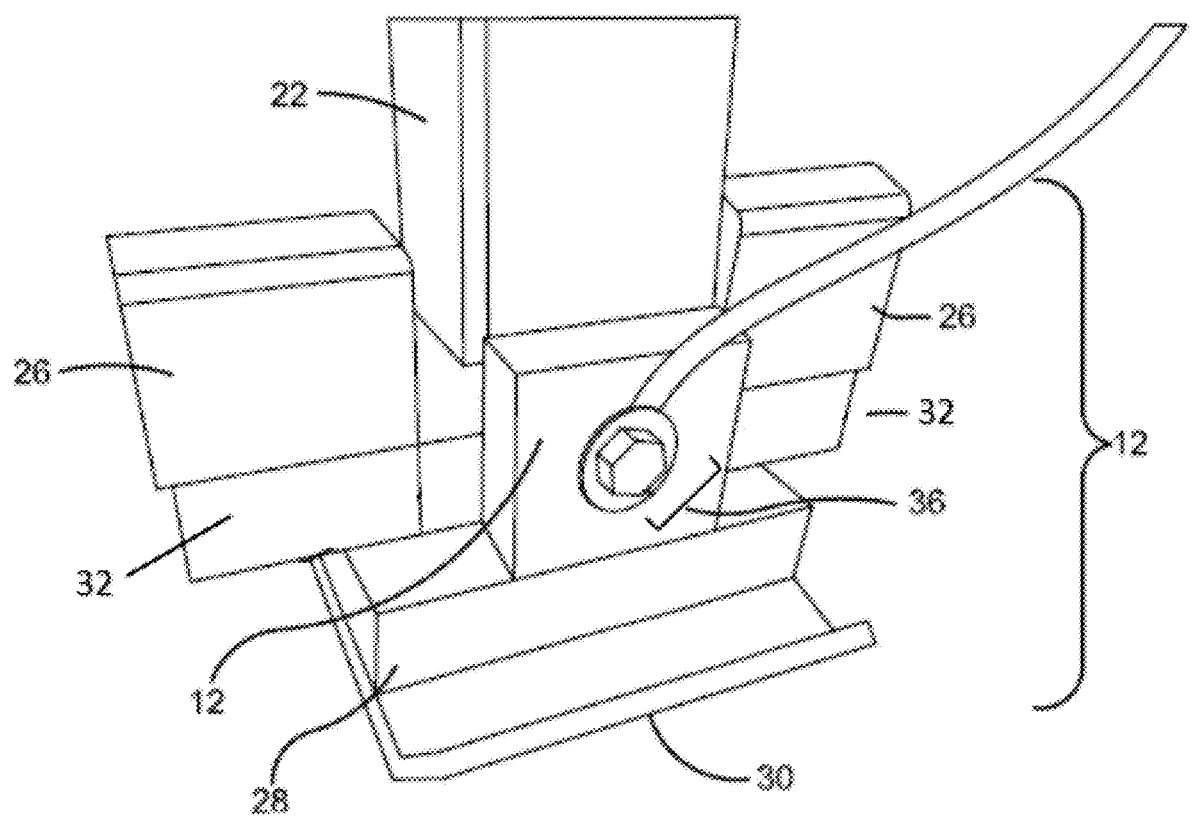
FIG. 6 is a perspective view of a support pad of a scaling system.
Figure 10:
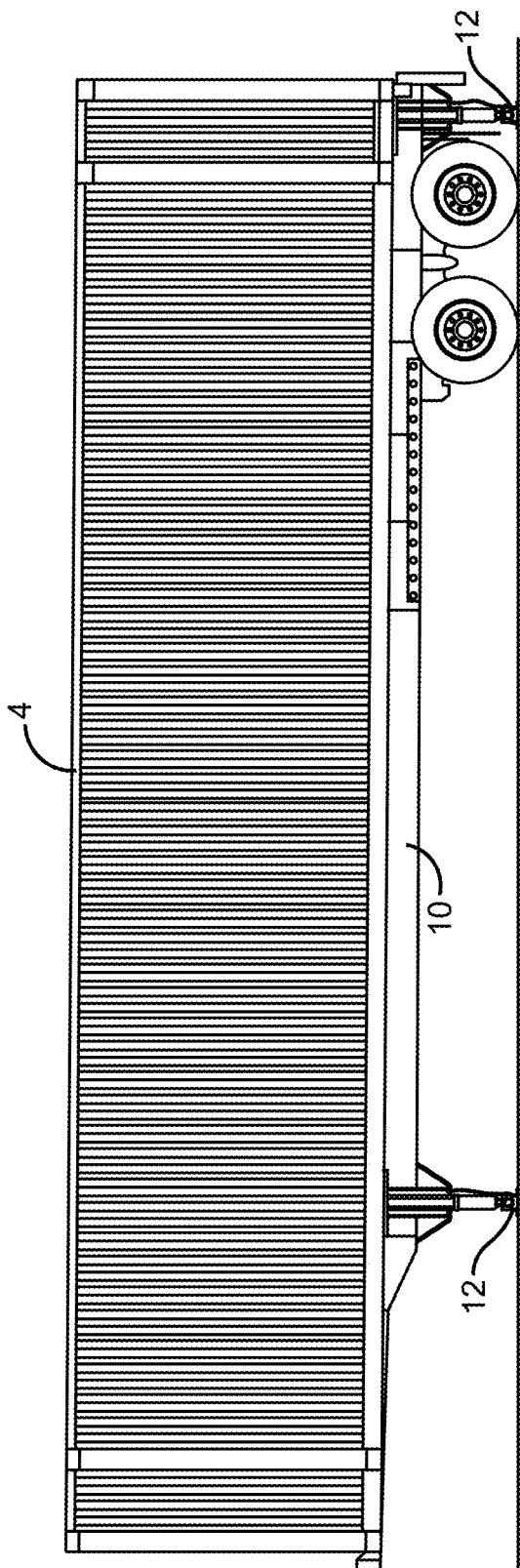
FIG. 10 is a side view of a scaling system installed on a trailer having a shipping container that is in an engaged position.
Figure 11:
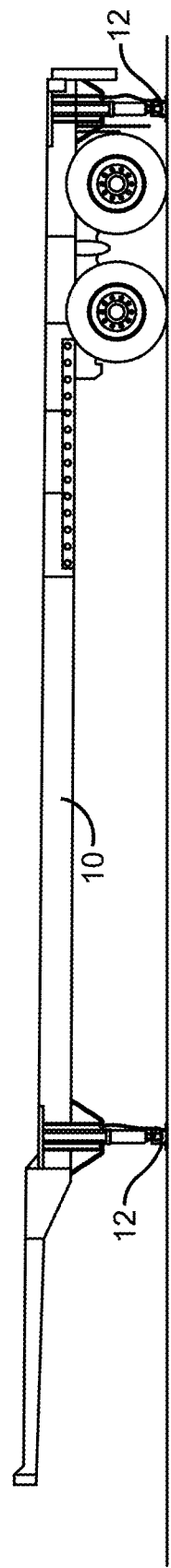
FIG. 11 is a side view of a scaling system installed on a trailer without a shipping container that is in an engaged position.

With reference to the embodiment shown within FIGS. 1-14, the custom scaling system includes two landing gear scales (12) incorporated into a front landing gear (14) of a trailer and two landing gear scales (12) positioned on the chassis of a trailer behind the rear trailer axles. FIGS. 1, 2 and 10 illustrate a shipping container (4) positioned on a trailer chassis (10) with an installed scaling system. The landing gear scales are designed to operate between a retracted position during transport of the shipping container and an extended position during operation of the scaling system. Operation of the landing gear scales between the retracted and extended position may be accomplished by selectively and manually operating a mechanical support device. In other embodiments, operation of the landing gear scale between a retracted and an extended position may be accomplished by selectively operating a pneumatic or hydraulic support device.

As shown within FIGS. 3, 4, 7, 10, 11, 19, and 20, the front landing gear scale (12) is incorporated into the front landing gear (14) of a trailer. The front landing gear of the trailer includes a first receiving channel (16) mounted or welded to a first side of the chassis (10) adjacent to the front landing gear (14) and a second receiving channel (18) mounted or welded to a second side of the chassis (10) adjacent to the front landing gear (14). According to certain aspects of the present teaching, the front landing gear (14) may include a crossbeam (20) that connects the first receiving channel (16) to the second receiving channel (18) to provide structural support to the unit. Inserted within each receiving channel of the front landing gear (14) is a movable support (22) that is capable of being extended or retracted from within the receiving channel to the desired position. The bottom end of each movable support (22) is connected to the front landing gear scale (12) that contacts a ground surface or landing pad when the movable support is in a fully extended position.

Figure 19:
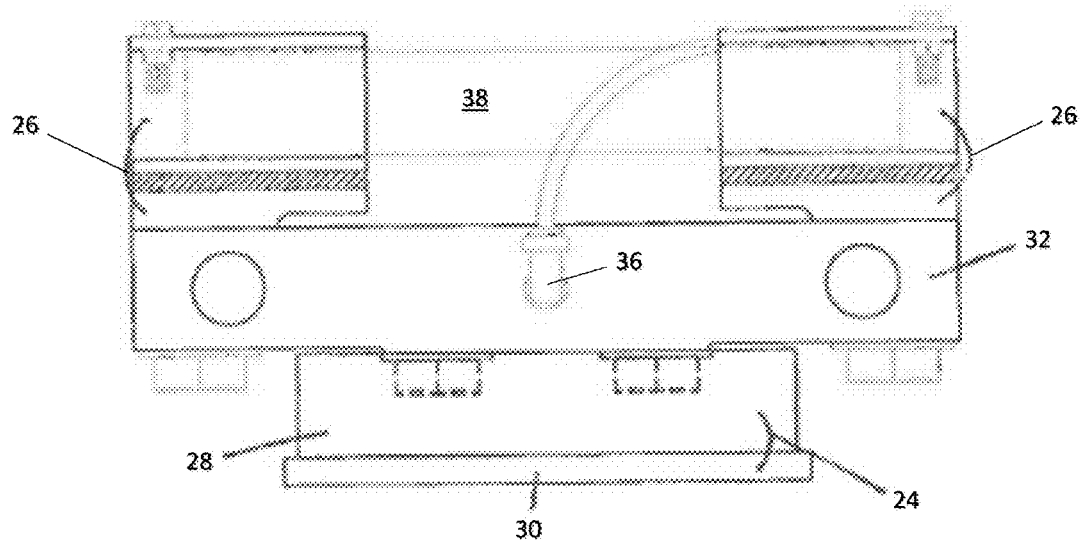
FIG. 19 is a front view of the landing gear scale with the vertical pivot stops removed so as to better show the spatial relationship between the various components.
Figure 20:
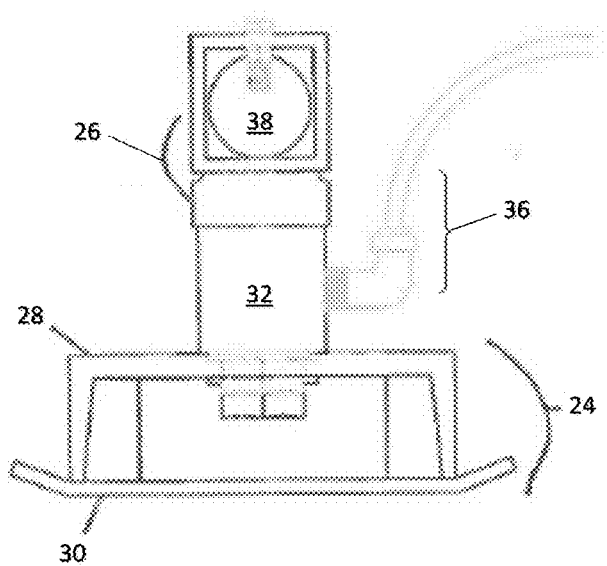
FIG. 20 is a side view of the landing gear scale with the vertical pivot stops removed so as to better show the spatial relationship between the various components.

With specific reference to FIGS. 19 and 20, load cell mounting pads on a pivoting axis (26) connect the front landing gear scale (12) to the movable support (22). A support bar (38) allows the front landing gear scale (12) to rotate about a first axis as the landing gear (14) extends to contact the ground. The front landing gear scale (12) consists of a load cell (32) that is connected to a support pad (24) (also referred to as a "sandshoe") which includes a supportive mounting unit (28) having a landing plate (30) with two raised portions on a first and second side of the plate to prevent the landing gear scale from catching on a surface during positioning and travel. As shown within FIGS. 6 and 8, a load cell (32) is mounted onto the front landing gear scale (12) below the movable support (22). The load cell or front landing gear scale (12) may be mounted to the unit in any manner that is suitable to a person of skill in the art. For example, the load cell or front landing gear scale (12) may be mounted to the movable support (22) or front landing gear (14) by bolting it onto a bracket. The load cell or front landing gear scale (12) includes two vertical pivot stops (34) on opposing sides which are positioned adjacent to the load cell or front landing gear scale (12) and below the movable support (22). The vertical pivot stops (34) limit the angle of rotation of the landing gear scale (12) to ensure the support pad (24) always makes contact with a surface and does not over-rotate (which could potentially damage the unit). FIGS. 19 and 20 omit the presence of the vertical pivot stops (34) in order to better show the relation between the various components of the landing gear scale (12). The load cell or front landing gear scale (12) includes a strain-gauge circuit built into the unit (not shown) and a sensor that is electrically connected to a control panel. This connection is achieved by hard wiring the load cell (32) to the control panel through a load cell connector (36). The embodiment described above allows the front load cells to be placed under load or engaged by simply disconnecting the tractor from the trailer. In this embodiment, the load cells are built into the front landing gear of the trailer and the front landing gear of the chassis provides the structural support for engaging the front load cells with the ground surface.

As shown within FIGS. 5, 6, 7, 9, 10, 11, 19, and 20, the rear landing gear (14) includes a first receiving channel (16) mounted or welded to a first side of the chassis (10) behind the rear axle (36) and a second receiving channel (18) mounted or welded to a second side of the chassis (10) behind the rear axle (36). According to certain aspects of the present teaching, the rear landing gear (14) may include a crossbeam (20) that connects the first receiving channel (16) to the second receiving channel (18) to provide structural support to the unit. Inserted within each receiving channel of the rear landing gear (14) is a movable support (22) that is capable of being extended or retracted from within the receiving channel to the desired position. The bottom end of each movable support (22) is connected to a rear landing gear scale (12) that contacts a ground surface or landing pad when the movable support is in a fully extended position.

With specific reference to FIGS. 19 and 20, load cell mounting pads on a pivoting axis (26) connect the rear landing gear scale (12) to the movable support. A support bar (38) allows the rear landing gear scale (12) to rotate about a first axis as the rear landing gear (14) extends to contact the ground. The front landing gear scale (12) consists of a load cell (32) that is connected to a support pad (24) (also referred to as a "sandshoe") which includes a supportive mounting unit (28) having a landing plate (30) with two raised portions on a first and second side of the plate to prevent the landing gear scale from catching on a surface during positioning and travel. A load cell (32) is mounted onto the rear landing gear scale (12) below the movable support (22). The load cell or rear landing scale (12) may be mounted to the unit in any manner that is suitable to a person of skill in the art. For example, the load cell or rear landing gear scale (12) may be mounted to the movable support (22) or rear landing gear (14) by bolting it onto a bracket.

With reference to FIG. 8, the load cell or the rear landing gear scale (12) includes two vertical pivot stops (34) on opposing sides which are positioned adjacent to the load cell (32) and below the movable support (22). The vertical pivot stops (34) limit the angle of rotation of the landing gear scale

(12) to ensure the support pad (24) always makes contact with a surface and does not over-rotate (which could potentially damage the unit). FIGS. 19 and 20 omit the presence of the vertical pivot stops (34) in order to better show the relation between the various components of the landing gear scale (12). The load cell or rear landing gear scale (12) includes a strain gauge circuit built into the unit (not shown) and a sensor that is electrically connected to a control panel. This connection is achieved by hard wiring the load cell (32) to the control panel through a load cell connector (36). The embodiment described above allows the rear load cells to be placed under load or engaged by lowering the rear landing gear until it contacts the ground surface or landing pad. In this embodiment, the load cells are built into a rear landing gear that is installed onto the back end of the trailer's chassis.

Figure 12:
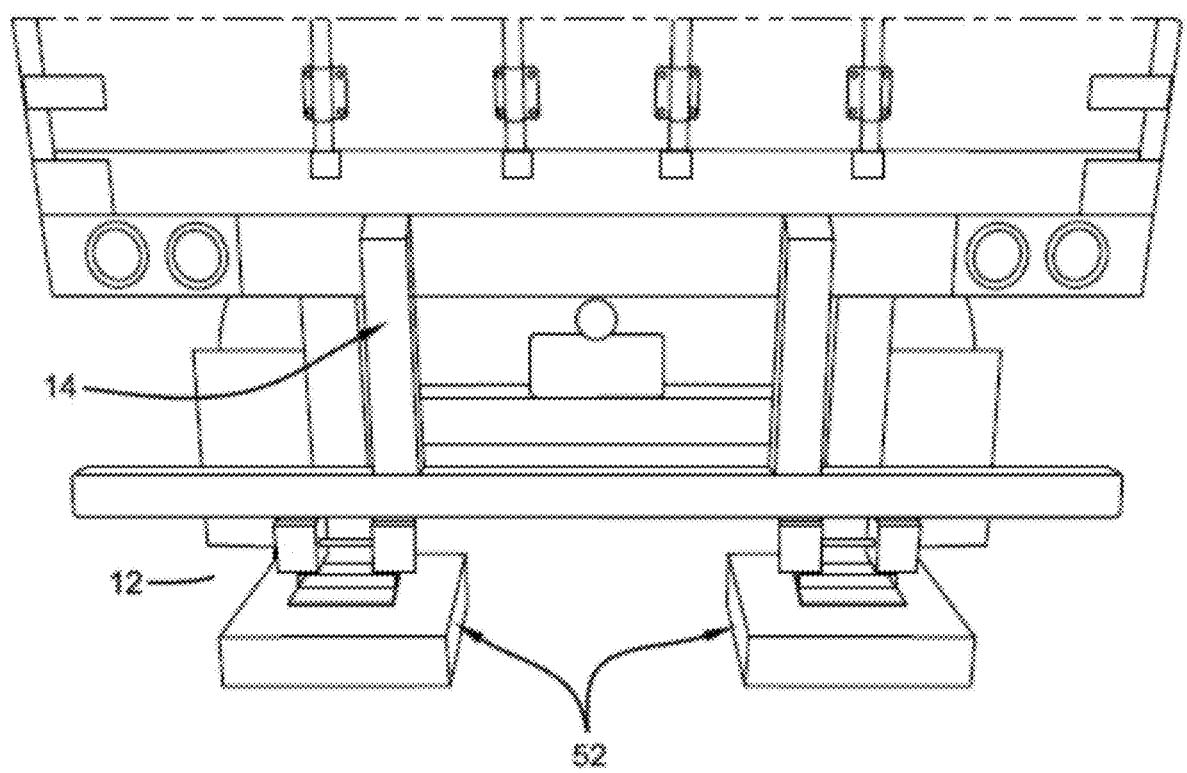
FIG. 12 is a rear view of the rear landing gear scale when in the engaged position.
Figure 13:
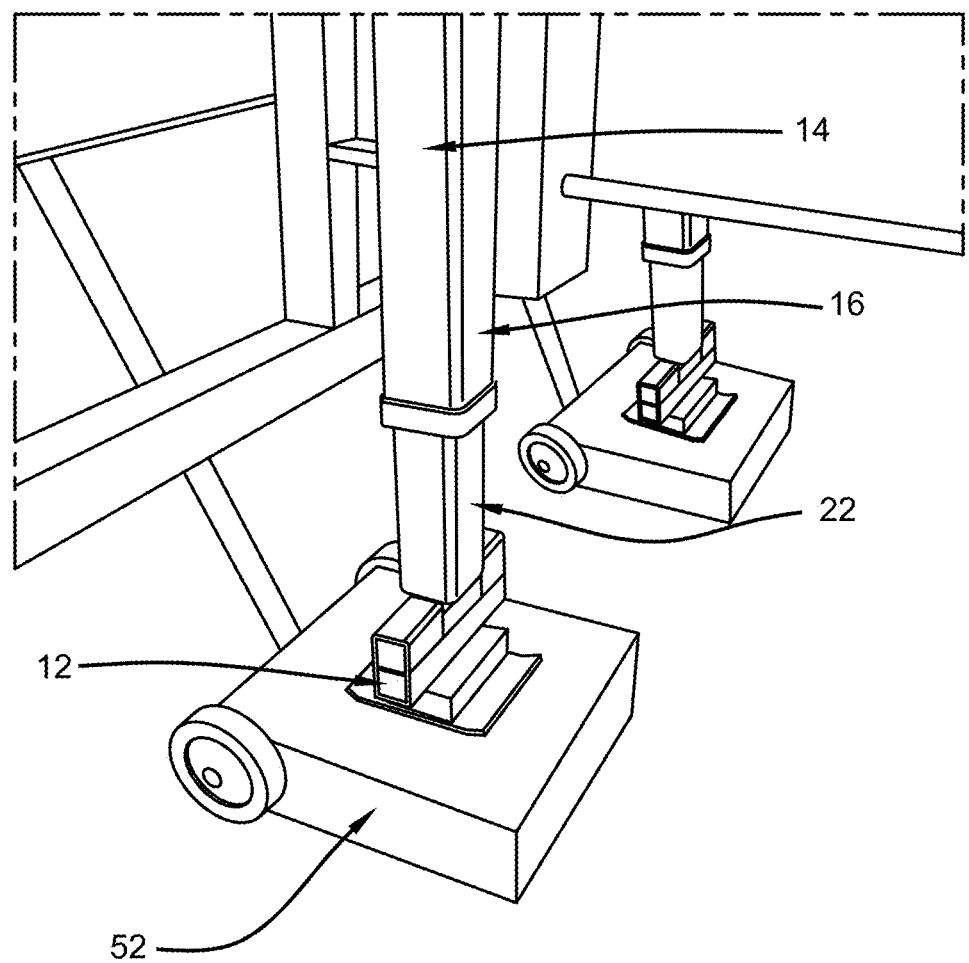
FIG. 13 is a perspective view of the rear landing gear scale when in the engaged position.
Figure 14:
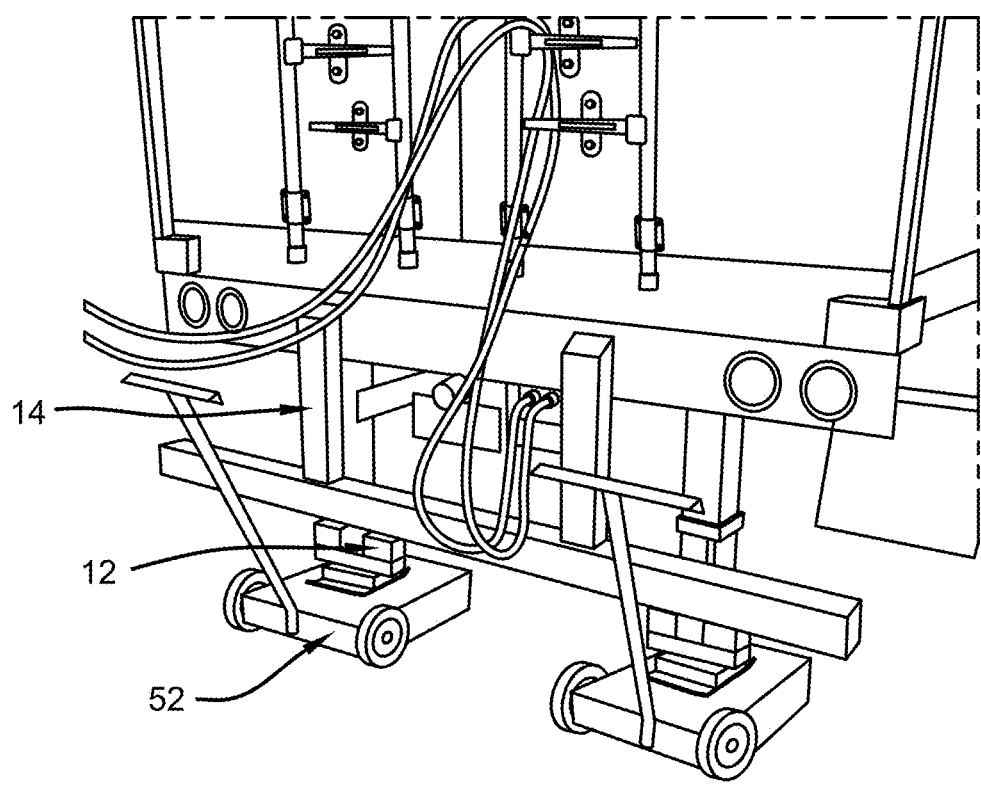
FIG. 14 is a perspective view of the rear landing gear scale when in the engaged position.

According to certain aspects of the present teaching, the rear landing gear scale may be engaged by physically cranking a landing gear down until the unit engages the ground or some type of pad or spacer. In further aspects of the present teaching, this cranking mechanism may also be applied to the front landing gear. With reference now to FIG. 12, a spacer (52) is shown which may be inserted beneath that of the rear landing gear scale (12) and the ground. While the spacer (52) shown below is associated with that of the rear landing gear scale (12), a similar type of spacer (52) may also be used with that of the front landing gear scales as well. A spacer (52) may be associated with each of the rear landing gear scales (12) present. The spacer (52) according to this embodiment may be a wooden block or other similar structure capable of supporting the weight of the shipping container and thereby stabilizing the rear landing gear scale (12). According to the embodiment shown in FIGS. 13 and 14, the spacer (52) may be affixed with a pair of selectably engageable wheels so as to increase the mobility of such a spacer, allowing the spacer (52) to be easily manipulated from the underside of the rear landing gear scales (12). Such manipulation of the spacer (52) may further be by way of an arm extension or other similar device which allows for a user to easily control and manipulate the spacer (52) from a distance somewhat removed from that of the spacer (52), thus eliminating the need for physically entering the space beneath that of the rear landing gear scale (12). The spacer(s) (52) may thus be placed in the area located between that of the rear landing scales (12) and the ground surface, whereupon the rear landing gear (14) is transitioned into the engaged position, thus causing the rear landing gear (14) to physically engage the spacer(s) (52).

Once the front and rear landing gear scales are engaged, the suspension is essentially completely separated from the chassis and may be described as being "floated" in its hangers. This allows the chassis and the shipping container to deflect upon application of a load within the shipping container without the suspension providing a counteracting force or effect on the load. Previous weighing systems which use spring-type load cells require the brakes to be released as the container is loaded. This allows for movement within the suspension as the vehicle is loaded and allows the load to be completely transferred through a single-point load cell that is mounted between the springs. This present system does not require the wheels of the trailer to travel because the trailer, shipping container, and materials within the shipping container that are being weighed are separated from the tractor. This eliminates the movability of the wheels as an accuracy factor in the weighing process and allows for the brakes within the trailer to be engaged without requiring an air supply from the tractor. The scaling system allows for the trailer to be completely unmanned as there is no need for an operator or other ancillary equipment while the shipping container is being loaded and weighed.

According to certain aspects of the present disclosure, the front and rear landing gear scale each include two 350 ohm double-ended shear beam load cells (i.e., a total of four load cells) connected in parallel.

The scaling system may thus be described as a mobile system that is semi-permanently affixed to a solid surface. By having the load cells built into the landing gears, the weighing system is adaptable for use on various types of sites under variety of conditions. The load cells are adaptable to any type of site surface including gravel or dirt. All that may be necessary for engaging the landing gear scales is a pad or spacer to ensure that all load cells make contact with the surface. The process of engaging the scaling system begins with a driver of a tractor-trailer positioning the trailer adjacent to a recycling facility, in particular, adjacent to plenum and centrifugal fans positioned outside of the recycling facility. The trailer is disconnected from the tractor, parked and fixed into position. After the trailer is positioned, the front and rear landing gears are lowered to the ground by way of placing each of the front and rear landing gear scales in the extended position, whereby the movable supports are extended about the receiving channels until they reach the target surface, and the load cells are connected to the control monitor. Also, after the trailer is positioned, the shipping container on the trailer chassis is connected to the recycling plant by connecting the centrifugal fans to the shipping container. As shown within FIGS. 1 and 2, this may be accomplished by connecting a plenum (8) that extends from the centrifugal fan housing (6) to an opening within the shipping container (4). The custom scaling system is activated and operated through the control monitor. After turning on the scaling system, one may initiate the recycling process within the plant and activate the centrifugal fans to blow material within the shipping container. As the shipping container is loaded with material, the scaling system collects data and electronically transmits it to the control monitor inside the recycling plant. The control monitor receives and processes the data and then transmits it to a website on the Internet or to a subscription cellular service, allowing all accessible and recorded data to be remotely collected and viewed. This allows individuals to input remote operational decisions with respect to the operation of the recycling plan allowing for optimization of rubber dust collection and processing and minimizing overhead costs associated with such processes.

As mentioned above, the scaling system uses centrifugal fans to load the shipping container through duct work extending from the recycling plant to the shipping container. This introduces a number of factors including, but not limited to, fan size, fan speed, distance of duct work, and age of equipment which can affect how the front and rear ends of the shipping container is loaded. The scaling system described above can monitor this weight differential within the container by allowing the weight values measured from the front landing gear to be separate from the weight values measured from the rear landing gear. These values are transmitted to the control panel as unique values as well as a sum total. This information may be utilized by downstream rubber recyclers and vendors to monitor the total net weight of rubber dust collected, as well as front versus rear loading of the vessel. While the sum total weight is often considered the most valuable data, separating the front weight value from the rear weight value is almost just as valuable as it portrays how the vehicle is loaded. This data can be used to determine if a container can safely and legally be transported over the road (DOT stipulates specific weights per axle on commercial vehicles). The weight data is logged on a consistent basis in order to forecast future pickups for all monitored locations. This allows smart and efficient logistics planning, which can further reduce freight costs. Furthermore, rubber recyclers or vendors may use this weight data to maximize the allowable over the road weight to keep freight costs to their most effective bare minimum. This utilization of data has the greatest payback, both by preventing underloads and thus wasting freight dollars and also preventing illegal, dangerous, and expensive procedures to rectify overloads.

However, while it may make sense to maximize every available load of rubber dust for transport, it is not always practical. For example, downstream rubber recyclers or vendors may require rubber materials that have a certain consistency. The consistencies of rubber buffings produced of each tire production or retreading plant are known and input into the scaling system's control panel. This allows a downstream recycler or vendor to log into an online service account and use the custom scaling system to determine the closest available load that would provide the quickest turn-around time or the load with the largest volume, both relative to the appropriate rubber buffing consistency desired based on information collected and processed by the control monitor. Due to the fact that the rubber recycling process relies so considerably upon the consistencies of the rubber material, this method of monitoring the content of various shipping containers across a region acts similarly to a remote inventory management system. This allows production to continue with proper efficiency and quality control even in times of material shortages during peak seasons, while minimizing freight costs as much as possible.

In addition to the primary advantages the custom scaling system provides to rubber recycling businesses or vendors in the business of collecting the rubber buffings, the custom scaling system also provides advantages to commercial tire production and retreading plants. The method of remotely monitoring the rubber dust essentially makes the material collection process a true background process, as it makes the process entirely hands-off for the commercial tire production and retreading plant. This means that the scaling system eliminates the need for those who operate commercial tire production and retreading plants to track tire production and to provide or transmit data related to tire production to downstream recyclers or vendors. The types, quantities, and frequency of tires run are also unnecessary data, given that a live, exact value of net weight is always accessible by the custom scaling system. According to certain aspects of the present disclosure, the control panel may monitor additional working shifts, additional working days, and plant down time at the commercial tire production and retreading plant. This eliminates the need for personnel at the commercial tire production and retreading plant to directly communicate tire production data with the downstream recycler or vendor as the necessary data is always known and available. In addition, the custom scaling system essentially eliminates the possibility of overloading a shipping container. Therefore, procedures that must be undertaken by commercial tire production and retreading plants to correct such mistakes are no longer necessary. Even with a power or internet outage, logged data is still accessible so that a very educated guess with respect to the amount of material production can be calculated until the malfunction is corrected.

The process and functions described herein may be implemented in hardware, software, firmware, or any combination thereof within a computing device. If implemented in software, the functions may be stored on or transmitted over as one or more instructions or codes on a computer-readable medium. The steps of the method disclosed herein may be embodied in a processor-executable software application or module, which may reside on a tangible, non-transitory computer-readable storage medium of a computing device. Tangible, non-transitory computer-readable storage media may be any available media that may be accessed by a computer or mobile device. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer as well as combinations of the above. Additionally, the operations of the method disclosed herein may reside as one or any combination or set of codes and/or instructions on a tangible, non-transitory machine readable medium and/or computer-readable medium, which may be incorporated into a computer program product.

While the scaling and monitoring system has been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the disclosed scaling and monitoring should not be limited to any single embodiment, but rather construed in breadth and scope in accordance with the recitations of the appended claims.

What is claimed is:

1. An onboard weighing system for monitoring a materials collection system in the absence of an auxiliary air supply, comprising:
   a chassis and shipping container capable of housing processed materials;
   a front landing gear comprising:
      at least one receiving channel;
      at least one movable support capable of being removably inserted within said at least one receiving channel;
      at least one front landing gear scale affixed to the bottom of said at least one movable support about a pivoting axis, further comprising:
         a load cell having a sensor;
         a support bar positioned above said load cell which allows the front landing gear scale to rotate about a first axis as the landing gear extends to contact a target surface; and
         a support pad positioned beneath said load cell and including a supportive mounting unit having a landing plate with two raised portions on a first and second side of the landing plate to prevent the front landing gear scale from catching on a surface during positioning and travel;
   and a rear landing gear comprising:
      at least one receiving channel;
      at least one movable support capable of being removably inserted within said at least one receiving channel;

at least one rear landing gear scale affixed to the bottom of said at least one movable support about a pivoting axis, further comprising:
  a load cell having a sensor;
  a support bar positioned above said load cell which allows the front landing gear scale to rotate about a second axis as the landing gear extends to contact the target surface; and
  a support pad positioned beneath said load cell and including a supportive mounting unit having a landing plate with two raised portions on a first and second side of the landing plate to prevent the front landing gear scale from catching on a surface during positioning and travel;
wherein said at least one front and rear landing gear scales may be placed in an extended position such that the corresponding movable support of each landing gear scale is able to independently extend about the respective receiving channel until the support pad contacts a target surface and the landing gear scales are in continuous communication with a control panel unit for monitoring the weight of processed material contained in the shipping container.

2. The onboard weighing system of claim 1, wherein the front landing gear comprises a first and second receiving channel positioned adjacent to one another and connected via a crossbeam, and first and second movable supports capable of being removably inserted within said first and second receiving channels.

3. The onboard weighing system of claim 2, wherein the rear landing gear comprises a first and second receiving channel positioned adjacent to one another and connected via a crossbeam, and first and second movable supports capable of being removably inserted within said first and second receiving channels.

4. The onboard weighing system of claim 3, wherein a front landing gear scale is affixed to each of the first and second movable supports of the front landing gear.

5. The onboard weighing system of claim 4, wherein the front landing gear scale further comprises first and second vertical pivot stops positioned adjacent to said load cell, and said support pad has the landing plate with first and second skids located about opposing sides of said landing plate, wherein said first and second vertical pivot stops limit the angle of rotation of said load cell to ensure said support pad contacts the target surface when placed in the extended position.

6. The onboard weighing system of claim 5, wherein the rear landing gear scale further comprises first and second vertical pivot stops positioned adjacent to said load cell, and said support pad has a landing plate with first and second skids located about opposing sides of said landing plate, wherein said first and second vertical pivot stops limit the angle of rotation of said load cell to ensure said support pad contacts the target surface when placed in the extended position.

7. The onboard weighing system of claim 6, wherein a mechanical support is used to place the landing gear scales in the extended position.

8. The onboard weighing system of claim 7, wherein at least one spacer is used so as to place at least one of the landing gear scales in contact with the target surface.

9. The onboard weighing system of claim 6, wherein each of the landing gear scales is a 350 ohm double-ended shear beam load cell hardwired to the control panel.

10. The onboard weighing system of claim 1, wherein the storage area receives processed materials by way of a centrifugal housing fan connected by a plenum to a material processing facility.

* * * * *

UNITED STATES PATENT AND TRADEMARK OFFICE
CERTIFICATE OF CORRECTION

Page 1 of 1

PATENT NO. : 11,092,476 B2
APPLICATION NO. : 16/224131
DATED : August 17, 2021
INVENTOR(S) : Dave Little, Andy Little and Allen Rider It is certified that error appears in the above-identified patent and that said Letters Patent is hereby corrected as shown below:

On the Title Page

Item (73) Assignee delete "Spartan Enerrises, Inc." and insert --Sparton Enterprises, Inc.--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*